United States Patent Office 3,007,257
Patented Nov. 7, 1961

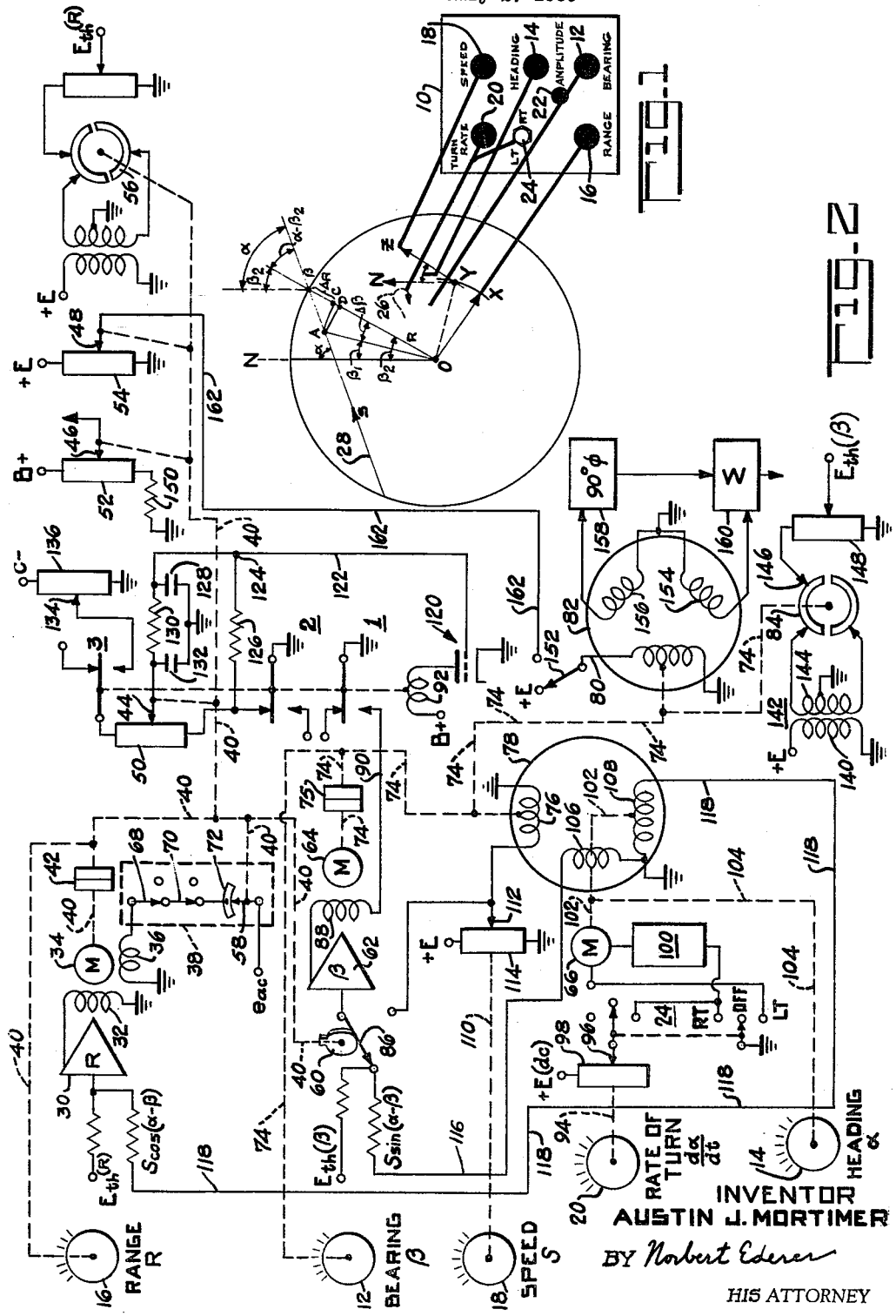

3,007,257
TARGET POSITION GENERATOR FOR
RADAR TRAINER
Austin J. Mortimer, Oldwick, Tewksbury Township, County of Hunterdon, N.J., assignor to Curtiss-Wright Corporation, a corporation of Delaware
Filed July 2, 1959, Ser. No. 824,525
3 Claims. (Cl. 35—10.4)

This invention relates to radar training systems, and more particularly to a target position generator therefor.

Target position generators for radar training systems are known in the art, an example being Patent No. 2,693,647 granted to Bolster et al. on November 9, 1954, in FIG. 2 thereof. The target position generator illustrated therein comprises several instructor-operated controls for presetting the Cartesian coordinates of the assumed radar station and also of the point of entry of the target at the desired location, with respect to an arbitrary origin. Two further controls are provided, and these are most important for the immediately subsequent considerations, namely a control for adjusting the speed of the target, and a control for adjusting the bearing of the target course. If the latter two controls are initially preset and not further manipulated thereafter, the target will "fly" a straight line path at constant speed and at constant bearing, which necessarily must lead to or from the radar station.

The radar training system of the Bolster et al. patent is intended principally for training the student in the operation of so-called IFF (identification friend from foe) radar systems on a P.P.I. (plan position indicator) radar screen; further in the interpretation of data presented on the screen. In the IFF systems the principal emphasis in interpreting the radar data is to sense the presence of the aircraft, whether friend's or foe's, and it is not essential whether the target will ultimately fly directly over the radar station or pass it at a distance. For example, a transcontinental non-stop flight from Los Angeles to Philadelphia would pass over Kansas City, and the Kansas City radar operator would not be too concerned whether or not the flight passes directly over the radar station or somewhere at a distance therefrom. It is for this reason, that the constant bearing course is an insignificant limitation in the Bolster et al. system, for the purposes that such system was intended.

The present invention contemplates use of the target position generator principally for training personnel in the use of radar information for control of air traffic in the immediate vicinity of the air field. Additionally, the radar training system incorporating the present invention may also be employed as a design tool to determine the number of targets that may be safely handled under various traffic and weather patterns with which the operator may be faced. The invention contemplates that the trainee act as traffic controller at the air field, while the instructor acts as pilot, in fact as a plurality, say six pilots, who fly the six "targets" on the basis of voice commands given by the trainee by manipulating six target position generators. Since the trainee observes the course of the target in terms of range and bearing, his commands to the instructor will be in these terms.

If the Bolster et al. system, including its target generators, were employed for the purposes just mentioned the instructor would be facing an unsurmountable obstacle. In the first place, a constant speed straight line flight path other than one directed to or from the radar station would require him to observe the instant X and Y coordinates indications of the target, compute therefrom the instant bearing and also rate of change of bearing and operate the couse bearing control accordingly and continuously. This he could not do for six targets, and probably not even for one target.

Accordingly it is a principal object of the invention to provide a target position generator, that frees the instructor from manual operation of the controls, except to the extent necessitated by the trainee's commands. In other words, it is desirable, and it is a further and more specific object of the invention to provide a target position generator which, with the instructor's controls untouched will give rise to a constant speed straight line course in any arbitrary preset direction, not necessarily over the station, or alternatively a constant speed circular loop path.

It is desirable, and is a further object of the invention that the instructor be provided with visual indication of the factors that he must control, and on a continuous basis, in the terms in which he will receive commands from the trainee, namely in polar rather than Cartesian coordinate terms of range, bearing, speed and rate of turn.

To the end of generating target motion and its visual display, it is desirable and is a further object of the invention to perform the required computations in polar terms rather than to convert from polar terms to Cartesian terms and finally back to polar terms.

The dependance exclusively on polar computation leads to considerable simplification of computing apparatus in comparison to the suggested alternative, which would amount to utilizing the X and Y coordinates of the Bolster et al. system to recompute rate of change of bearing and bearing. On the other hand the strictly polar coordinate computing philosophy leads to a new problem.

At will be seen hereinafter the computing apparatus solves on a continuous basis the following pairs of simultaneous equations:

(1) $$R = R_0 + \int S \cos(\alpha - \beta) dt$$

(2) $$\beta = \beta_0 + \int \frac{S \sin(\alpha - \beta)}{R} dt$$

where R is the target range, $R_0$ is the initial target range, S is the target speed, $\alpha$ is the target heading angle, $\beta$ is the target bearing angle, and $\beta_0$ is the initial bearing angle.

With reference especially to Equation 2, it is noted that the variable R (range) appears in the denominator of the integrand. Straightforward techniques would require that the integrand be first computed as the quotient of the above dividend and divisor and then integrated with respect to time. It is essential for the purpose of the present invention that computation at or near the origin, that is at short or even zero range be accurate. By resort to ordinary techniques one would be faced with the problem as yet not solved by any known computer, of dividing by zero. It is to be observed that although the integrand of Equation 2 becomes infinite at zero range, yet the computer integral is finite and varies only from 0 to 360°. Accordingly the invention features integrating means in which the troublesome division by zero is avoided. Such integrating means is novel, to my knowledge, in the analog computing art in its own right, that is apart from the specific application to radar target positioning generation.

Further objects, novel features, and advantages of the invention will be apparent from the following, more detailed specification, of which the appended claims form a part, when considered together with the accompanying drawings in which:

FIG. 1 is a polar coordinate vector diagram, explanatory of the geographic relations involved; and FIG. 2 is a schematic drawing of a target position generator in accordance with a preferred embodiment of the invention.

Referring to FIG. 1, the front panel 10 of the target generator includes a plurality of calibrated control dials operable by the instructor to insert the initial conditions of the target flight path, and also to alter the course during the progress of the exercise. These calibrated controls include a bearing ($\beta$) dial 12, a heading ($\alpha$) dial 14, a range (R) dial 16, a speed (S) dial 18, a turn rate $$\frac{(d\alpha)}{dt}$$

dial 20, and a target amplitude dial 22. A three-position turn direction switch 24 is operable from a center "off" position to "left" and "right" positions. It is operated conjointly with the turn rate control 20 to set the direction and magnitude of the rate of turn of the target respectively, as reflected by the partially circular target path 26 associated with the two controls. The range dial 16 controls the range, that is the distance of the target from the origin, designated by the vector OX associated with the range control. The heading control 14 adjusts the heading angle $\alpha$, that is the angle formed between the target path, vector YZ, and the North-South line as represented by vecor YN at the instant location of the target, Y. The speed control 18 determines the target speed along the target heading YZ, whereas the target amplitude control 22 is operable to adjust the intensity of the target as observed by the trainee on his P.P.I. screen.

The relations leading to the above Equations 1 and 2 may be derived from the remaining illustration of FIG. 1. It is assumed that the target flies at constant speed S along the straight line 28, that is at a constant heading angle $\alpha$. If the target is initially at point A, its bearing angle $\beta_1$ is the angle included by the North-South line ON passing through the radar station assumed to be at origin O, and line OA. The distance OA is the range R. At some time increment $\Delta t$ later, the target will have moved to point B. Its heading angle is still $\alpha$ as before but its bearing angle has now changed to a new value $\beta_2$ and its range is now $R+\Delta R$. The range increment $\Delta R$ is readily seen to be $S \cos (\alpha-\beta_2)\Delta t$. If $\beta_2-\beta_1$ is defined as $\Delta \beta$, the length of arc AC is $R\Delta\beta$. The normal from point A on line OC, line AD, is given by $$S \sin (\alpha-\beta_2)\Delta t$$

In the limit as the increments $\Delta R$ and $\Delta \beta$ approach zero, that is because differentials $dR$ and $d\beta$, the arc AC approaches the normal AD and we have:

(3) $$d\beta=\frac{S}{R}\sin (\alpha-\beta)dt$$

and (4) $$dR=S \cos (\alpha-\beta)dt$$

leading at once to Equations 1 and 2.

In addition to the above mentioned controls an individual "target freeze" switch is provided for each target position generator drawer, and an all "targets freeze" switch is available for use by the instructor. These switches are located on the console on which the individual target positioning drawers are mounted, and are therefore not illustrated in FIG. 1. The switches are illustrated in FIG. 2, to which reference is now made.

The computing system of FIG. 2 is an alternating voltage analog computing system in which the control signals are, with a few exceptions hereinafter noted, either in phase with or in phase opposition to a reference alternating voltage +E hereinafter encountered. There is provided a further reference voltage $e_{ac}$ which is 90° out of phase with reference voltage +E. The system also includes the following direct voltages: +E (D.C.), used for motor excitation, B+, used as tube plate supply voltage, and C—, employed as tube grid bias voltage.

In FIG. 2 the controls 14—20 and 24 are illustrated once more. A servo summing amplifier 30 receives an input control signal $S \cos (\alpha-\beta)$, generated in a manner hereinafter described and delivers the same signal in amplified form to a control winding 32 of a two-phase induction motor 34, which is also provided with a reference phase winding 36 that is grounded at one end and energized at its other end by the voltage $e_{ac}$ through a switch network 38. The additional input signal $E_{th}$ (R) to the amplifier 30 provides a fixed threshold voltage for overcoming motor friction and "stiction," so that even the slightest non-zero value of the principal input signal will start the motor 34. The derivation of the threshold voltage will be described hereinafter.

The motor 34 operates as an integrating motor, that is at a velocity proportional to the magnitude of the principal input signal $S \cos (\alpha-\beta)$ and in a direction according to the phase of this signal. The signal, as explained previously is in phase with or in phase opposition to reference voltage +E.

The motor 34 drives through mechanical connections 40, which include suitable reduction gearing (not shown) and a slip clutch 42, a plurality of driven members which include: range dial 16; sliders 44, 46 and 48 of linear (uniform contour) potentiometers 50, 52 and 54 respectively; a segmented slip ring 56; a rotary switch 58 included in switch network 38; and a switching cam 60 associated with a bearing ($\beta$) servo summing amplifier 62. The function of these driven members will be explained hereinafter.

The range servo system in effect mechanizes the solution of Equation 1 so that the instant position of the several driven members represents range. The instructor presets the range dial 16 to a desired initial range, and thereafter the position of the dial is changed on a continuous basis as the required integration proceeds. The slipping clutch 42 is provided for overriding the motor drive, so that the instructor may at any time select a new initial range, while the motor 34 continues to run.

The switching network 38 is typical of identical switching networks associated with the energization circuits of the bearing motor 64 and the rate of turn motor 66 hereinafter encountered. It includes three series connected switches, namely an individual "target freeze" switch 68, an all "targets freeze" switch 70, and the rotary range limit switch 58 previously referred to. The switch 68 is ganged to the corresponding individual target freeze switches associated with the motors 64 and 66 of the instant target generator. The instructor may operate switch 68 to freeze the target generated by the instant target positioning generator in place. Switch 70 is similar, but is ganged not only to the corresponding switches of the presently described target position generator, but also to all the corresponding switches of the remaining target positioning generators of the radar training system. The instructor may operate switch 70 to freeze all the targets in place for the purpose of demonstrating to the trainee the errors he has made. The range limit switch 58 engages an arcuate conductor 72 for so long as the target is within the maximum range of, say 150 miles from the radar station. It serves the purpose of avoiding needless continued operation of the three motors and the arms of their respective driven members.

It is apparent that opening any one of the three switches 68, 70 or 58 will open the energization circuit for the reference winding 36, thereby bringing motor 34 to a stop. Because of the unitary operation of the respective switching networks, the motors 64 and 66 will be brought to a stop simultaneously. Additionally in the case of opening of the switch 70 the three corresponding motors of the remaining target position generators will also stop concurrently.

The bearing computing system includes the bearing motor 64 and servo summing amplifier 62 previously referred to, which function broadly in the same manner as the range computing system. The motor 64 drives through similar connections 74 including gear reduction (not shown) and slip clutch 75, the bearing indicator 12, a winding 76 of a synchronous resolver 78, a rotor winding 80 of another synchronous resolver 82, and a segmented slip ring 84 similar to ring 56. The function of these several driven members will be explained hereinafter. The principal input signal to the amplifier 62 is the signal $S \sin (\alpha-\beta)$ which is augmented by a threshold signal $E_{th}$ ($\beta$), which is analogous to the threshold signal $E_{th}$ (R). The input signals are applied to the amplifier through the switch 86 driven by cam 60, which for the time being may be assumed to be in the indicated position. The reference phase excitation circuitry for motor 64 is identical to that of motor 34, even to the extent of inclusion of a switching network similar to network 38, and is therefore not shown. The control winding 88 is however shown expressly, for unlike winding 36 it is not grounded permanently, but rather is connected via line 90 to the NO (normally open) contact of a relay 92 whose coacting movable and NC (normally closed) contacts are respectively grounded and unconnected. As will be seen hereinafter, the relay 92 is alternately energized and deenergized, the available period of energization being proportional to $$\frac{1}{R}$$

so that the motor 64 is energized intermittently. The motor thus runs at a speed proportional to its input signal $S \sin (\alpha-\beta)$ and for time intervals proportional to $$\frac{1}{R}$$

so that the motor in effect integrates $$\frac{S}{R} \sin (\alpha-\beta)$$

to produce bearing in accordance with Equation 2.

In operation, the bearing dial 22 is preset to some initial bearing value by the instructor, and thereafter is driven by the bearing motor 64 through the connection 74 to indicate the instant bearing of the target as the training exercise proceeds. The instructor may override the driving effect of the motor by manually operating the dial 22 and thus reposition the target, even as the motor continues to run.

The rate of turn dial 20 is operable solely manually by the instructor. It drives through connections 94 the slider 96 of a rheostat 98 that is energized by motor excitation voltage +E (D.C.). The slider 96 is connected to the upper switch arm of the double pole double throw rate of turn selector switch 24, the lower movable switch arm being grounded. An energization circuit for the motor 66 may be completed by transferring the switch 24 from the indicated center "off" position to the upper position for right turns of the target or to the lower position for left turn. In the upper position the energization circuit is completed from wiper 96 through motor 66 and a switching network 100, similar to network 38 and the lower switch arm to ground, whereas in the latter case the connections are reversed, resulting in opposite rotation of the motor. To execute a target turn, the instructor throws switch 24 to the appropriate position and sets dial 20 to the desired rate of turn. This may be done at any time during the training exercise. The motor 66 drives through connections 102, again including gear reduction and slip clutch (not shown), the heading dial 14 and also a pair of quadrature rotor windings 106 and 108 of the resolver 78. The heading dial 14 may be preset by the instructor at the beginning of the exercise, and is thereafter positioned by motor 66 to provide indication of the instant heading of the target.

The speed dial 18 may be adjusted by the instructor at any time during the training exercise to control target speed and provide visual indication thereof. It drives through connections 110 the slider 112 of a potentiometer 114 which is connected at its upper and lower ends to the voltage +E and ground respectively. The slider 112 thus derives a voltage that is proportional to the setting of dial 18, that is speed, and this voltage serves as input voltage for the resolver stator winding 76 whose other end is grounded. The designation of "stator" and "rotor" is arbitrary, as in this instance all windings of the resolver 78 are rotatable.

Winding 76 induces in the rotor windings 106 and 108 voltages which are proportional to trigonometric functions of the angular displacement between stator and rotor. Since the rotors are in a position corresponding to heading angle $\alpha$ and the stator corresponding to that of bearing angle $\beta$, the voltages induced in the windings 106 and 108 are respectively $S \sin (\alpha-\beta)$ and $S \cos (\alpha-\beta)$. These voltages are applied as principal inputs to the bearing and range servo amplifiers via lines 116 and 118 from respective ends of the rotor windings 106 and 108, the other ends being grounded.

The relay 92 and associated circuitry function in the following manner. The relay coil is connected at one end to the B+ voltage and at its other end to the plate of a triode 120 whose cathode is grounded and whose grid is alternately placed at potentials permitting and inhibiting tube current conduction, thereby alternately energizing and deenergizing the relay. The grid is connected via line 122 to the junction 124 of a high meg resistor 126, charging capacitor 128 and charging resistor 130. Assuming that the relay 92 has just released, the capacitor 128 whose other end is grounded, will be initially at a potential sufficient to ensure tube cutoff. Thereafter the capacitor will discharge towards ground potential through the resistive-capacitive paths indicated including the other end of resistor 130 and capacitor 132 to ground, and the slider 44 of range potentiometer 50 and the section of this potentiometer below the slider, and the NC contact 2 of the relay to ground. The resistor 126 which interconnects junction 124 and the NC contact 2 plays little part in the discharge in virtue of its high resistance compared to that of resistors 130 and 50. As soon as the potential of capacitor 128 has relaxed sufficiently towards 0 volts to permit tube current conduction, the relay 92 is energized and its contacts are transferred. This initiates running of motor 64 as previously described, also disconnects the lower end of potentiometer 50 from ground and connects its upper end through NO contact 3 of the relay to a slider 134 of a potentiometer 136 whose upper and lower ends are connected to the C— voltage and ground. The NC contacts 1 and 3 and NO contact 2 are unconnected and serve merely as stops.

Slider 134 is adjusted for proper cutoff of the tube 120 as described in part so far and in part immediately hereinafter. When the NO contact 3 of the relay closes, the slider 44 is placed at a negative potential proportional to its position. This potential is not transmitted to the grid of tube 120 immediately, as the capacitors 128 and 132 require some time to charge to the new voltage produced by closure of the realy contact. After some time lapse the capacitor 128 is charged sufficiently negatively to cut off the tube, thereby deenergizing the relay and stopping the motor 64. This sequence of events is periodic, so that the relay is energized and deenergized and consequently the motor 64 runs and stops, as the capacitor 128 discharges towards ground potential and recharges to a negative potential. The negative potential is in accordance with the position of the slider 44, and is most highly negative at maximum range and is zero at zero range. Thus as the slider is positioned from the upper end to the lower end of the potentiometer 50, the on-time of the relay 92 will increase and its off-time will decrease; the to tal period, that is off-time plus on-time also varies with changing slider position. The average running time of the motor 64 is proportional to $$\frac{1}{R}$$

This may be verified theoretically and is borne out experimentally by a straight line, constant speed target course under conditions of constant speed S and zero rate of turn, with all controls left untouched.

The infinity that arises at zero range is not per se troublesome; this merely means that the on-time should be infinite, that is the relay 92 should be continuously energized and accordingly the motor 64 should run continuously. This condition is realized by virtue of the fact that the slider 44 reaches the lower end of potentiometer 50, which because of continued energization of the relay is grounded continuously. However other practical considerations dictate that special changes be made at the origin. For one, the threshold voltage $E_{th}$ ($\beta$) must be reversed in phase in passage through the origin. This is true also of the threshold voltage $E_{th}$ (R). Further, the bearing angle $\beta$ is ambiguous at the origin, as the origin represents the entire circular range of bearing angles.

At a range of approximately one mile, the range cam 60 positions the switch 86 to the alternate position, thereby connecting the full speed voltage of slider 112 to the input of the bearing amplifier. This causes a relatively rapid passage of the target over the origin. As soon as the target is again at a range in excess of one mile, the normal input to the amplifier 62 is reconnected.

Generation of the two threshold voltages is by analogous circuits, so that the single description pertaining to the bearing system will suffice. The primary winding 140 of a transformer 142 is connected at one end to the reference voltage +E and is grounded at its other end. The secondary winding 144 is grounded at its center tap and impresses voltages on the two segments of slip ring 84. A brush 146 engages the slip rings and connects to the upper end of a potentiometer 148 whose lower end is grounded. The threshold voltage is derived from the slider of potentiometer 148. The arrangement is such that the brush 146 is transferred from one segment to the other as the bearing angle reverses in sign.

A direct voltage representative of range is available at the slider 46 of potentiometer 52, which is connected to the B+ voltage at its upper end and returned to ground through a resistor 150 at its lower end. The voltage at slider 46 may now be applied as a range input voltage to the radar trainer proper, for example to the "squaring tube" 101 of the range pulse generating system illustrated in FIG. 5 of the aforesaid Bolster et al. patent. This system serves for generation of a variable pulse delay in accordance with range.

The bearing representative voltage is generated in the following manner. Referance voltage +E is applied to the upper end of rotor winding 80 of the resolver 82 through a switch 152. The lower end of the winding is grounded. Recalling that the angular position of the rotor is proportional to $\beta$, and taking the energization voltage of the rotor as $E \cos \omega t$, the two stator windings 154 and 156 will have induced therein voltages $E \cos \omega t \cos \beta$ and $E \cos \omega t \sin \beta$. The latter voltage is passed through a 90° phase shift network 158 at whose output it is in the for $-E \sin \omega t \sin \beta$. This signal is summed with the signal available from stator 154 in a summing network 160 whose output, upon trigonometric substitution becomes $E \cos (\omega t + \beta)$. This is a voltage of constant amplitude and of phase proportional to the bearing angle $\beta$. This voltage may be utilized as input to the "squaring circuit" 108 of FIG. 5 of the Bolster et al. patent. It is noted that the target generator illustrated in FIG. 2 of the Bolster et al. patent provides an ouput voltage that is proportional to range and is of a phase varying in proportion to bearing angle. This signal is applied to the "range and azimuth chassis" of FIG. 5 of the patent, but there it is once more decomposed into range and bearing or azimuth voltages.

In the arrangement described herein separate range and bearing voltages are provided. However the apparatus may be readily modified so as to admit of direct substitution for the Bolster et al. target position generator. To this end the switch 152 is placed in the alternate position, in which instead of fixed voltage +E, a voltage proportional to range is applied to the rotor winding 80. This latter voltage is derived via line 162 from the slider 48 of the range potentiometer 54 which is energized by the voltage +E at its upper end and is grounded at its lower end. In this case the summing network 160 delivers a voltage having a magnitude proportional to range and a phase proportional to bearing, as does the target position generator of FIG. 2 of the Bolster et al. patent.

Thus it will be seen that in accordance with the invention I have provided a target positioning system that is simple and efficient and possesses the desirable feature of generating a straight line constant speed target course with the dials left untouched. Alternatively, if a constant rate of turn is superimposed by actuation of dial 20 and switch 26, the target will fly a circular path, without further manipulation by the instructor.

Many modifications of the basic apparatus are possible, and it is intended that such modifications as do not depart from the true spirit and scope of the invention be comprehended as within the invention. For example the control winding 88 of the motor 64 may be grounded permanently and line 90 may be connected to a suitable solenoid adapted to engage and disengage the clutch 75 in response to operation of the relay 92. In accordance with such modification, the motor 64 runs continuously, but the members coupled thereto are driven intermittently to produce the required integration as a function of range. The advantage of this alternative is in the avoidance of inaccuracies due to the constant starting and stopping of the motor. The motor may be loaded permanently so as to render the effect of the additional torque presented by the driven members upon engagement of the clutch 75 negligible.

It will also be appreciated that the relay 92 and associated circuitry function as an astable circuit means that has an on-time related to the instant D.C. voltage derived from the range potentiometer 50. Other suitable astable generators may be employed, for example an unsymmetrical astable multivibrator or phantastron whose period and also on-time, as is well known may be varied with variation of control voltage applied thereto. In such case the relay 92 may be connected in the plate circuit of one of the multivibrator or phantastron tubes.

It will be recalled that the bearing servo system functions to integrate the quotient of $S \sin (\alpha - \beta)$ and R. However this can be readily converted to an integrator of the product of the same two variables simply by interchanging the connections of the NC and NO contacts 1 of relay 92. This represents a further modification of the previously disclosed inventive concept intended to be embraced within the present invention.

What is claimed is:

1. In an analog computer, means for computing the integral of an integrand representing the quotient of two variables, comprising means producing an electrical signal representing the dividend variable; a potentiometer having a slider whose position represents the divisor variable and having a pair of terminals for application thereto of energizing potentials; an integrating motor responsive to said dividend signal and adapted to run at a speed substantially proportional thereto; moveable means driven by said motor; an astable switching means for effectively alternately disabling and re-enabling motion of said moveable means for time intervals in accordance with the position of said slider, thereby to render the position of said moveable means representative of said integral; said astable switching means comprising an electron tube having a grid, a plate and a cathode; a relay having a relay coil and a plurality of relay contacts; plate circuit supply means for said tube including said relay coil; a charging network interconnecting said slider and grid; means including contacts of said relay to apply a first bias potential to one of said potentiometer terminals when said relay is energized, and means including contacts of said relay to apply a second bias potential to the other of said potentiometer terminals when said relay is deenergized, said bias potentials selected to drive said tube substantially below plate current cut-off and to substantial conduction respectively, were they applied directly to said grid; and a circuit including relay contacts for effecting said alternate disabling and reenabling, whereby said grid charges through said charging network alternately upon relay energization towards the cut-off potential then provided by said slider ultimately to cause its de-energization, and upon such de-energization towards the conduction-permitting potential then presented by said slider ultimately to cause its re-energization.

2. In an analog computer, an integrator for computing the integral of an integrand representing a joint mathematical function of two variables, comprising individual means producing first and second electrical input signals respectively representing said variables; an integrating motor responsive to said first input signal and adapted to run at a speed substantially proportional thereto; moveable means driven by said motor; and astable switching means for alternately energizing and deenergizing said motor for time intervals in accordance with the other of said input signals, thereby to render the position of said driven means representative to the integral of said joint function, the astable switching means comprising an amplifier device having a control terminal and an output circuit; relay means comprising a relay coil that is included in said output circuit and further comprising a plurality of relay contacts, some of which are included in an energization circuit for the motor for effecting its aforesaid energization and deenergization in accordance with the state of energization of said relay means; a charging network connected to said control terminal; and means including relay contacts to apply to said charging network alternately said second signal and a fixed signal, the latter two signals alternately charging said control terminal through said charging network to potentials permitting and inhibiting current flow in said output circuit for time intervals in accordance with said second signal, whereby alternately to energize and deenergize said relay means to produce astable operation thereof.

3. A target position generator for a radar simulator, comprising a plurality of controls operable by an instructor initially to set in a plurality of factors affecting the path of the simulated target including its speed, bearing, heading and rate of turn with reference to a predetermined origin representing a simulated radar station; indicating means associated with each control for reflecting the respective target factors; a range computing, a bearing computing, and a heading computing integrating means each further controlling the respective like-named indicating means subsequent to initial set-in to provide continued indication of the respective target factor; function generating means associated with said speed and rate of turn controls for deriving respective electrical signals, the rate of turn signal serving as the input integrand signal to said heading integrator; resolving means energized by said speed signal and under control initially of said bearing and heading controls and subsequently of said bearing and heading integrators, for providing a pair of voltages representing $S \cos (\alpha-\beta)$ and $S \sin (\alpha-\beta)$ respectively, where S is said speed, $\alpha$ said heading, and $\beta$ said bearing; means to apply said $S \cos (\alpha-\beta)$ signal as the input integrand signal to said range integrator; means to apply said $S \sin (\alpha-\beta)$ signal as an input signal to said bearing integrator; means additionally to control said bearing integrator according to reciprocal range as computed by said range integrator to compute bearing as the integral of $$\frac{S}{R} \sin (\alpha-\beta)$$

where R is said range; and means associated with said range and bearing computers for providing signals representative of the computed range and bearing for utilization in said simulator, each integrator comprising an integrating motor, the instructor-operable controls together with associated calibration indicia forming the aforesaid indicators, and the bearing, heading and range control being coupled to the respective like-named motors and driven thereby to provide the aforesaid continuous subsequent indications, a plurality of moveable members coupled to and driven by the bearing motor, said members including the bearing control as aforesaid and additionally elements of the resolving means and of the mean providing signals representative of the computed range and bearing; a potentiometer included in the additional control means for the bearing integrator, and provided with a slider driven by the range motor, and with a pair of terminals for application thereto of energizing potentials; and astable switching means for effectively alternately disabling and reenabling motion of said moveable members for time intervals in accordance with the position of said slider, said astable switching means comprising an amplifier device having a control terminal and an output circuit; relay means comprising a relay coil that is included in said output circuit and further comprising a plurality of relay contacts, a circuit including some of said relay contacts for effecting said alternate disabling and reenabling in accordance with the state of energization of said relay means; a charging network connected to said control terminal; and means including relay contacts to apply to said charging network alternately said second signal and a fixed signal, the latter two signals alternately charging said control terminal through said charging network to potentials permitting and inhibiting current flow in said output circuit for time intervals in accordance with said second signal, whereby alternately to energize and deenergize said relay means to produce astable operation thereof.

References Cited in the file of this patent

UNITED STATES PATENTS

| 2,475,314 | Dehmel | July 5, 1949 |
| 2,506,998 | Dehmel | May 9, 1950 |
| 2,674,812 | Hales | Apr. 13, 1954 |
| 2,963,794 | Peck | Dec. 13, 1960 |

OTHER REFERENCES

"Electronics" (publ.), September 1953, pp. 137–139. Article by W. B. Birtley.